United States Patent
Berstis et al.

(10) Patent No.: US 8,463,766 B1
(45) Date of Patent: Jun. 11, 2013

(54) SYSTEMS AND MEDIA FOR AWARDING CREDITS BASED ON PROVIDED USAGE INFORMATION

(75) Inventors: Viktors Berstis, Austin, TX (US); Randolph Michael Forlenza, Austin, TX (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/305,658

(22) Filed: Nov. 28, 2011

Related U.S. Application Data

(63) Continuation of application No. 12/122,186, filed on May 16, 2008, now Pat. No. 8,073,852, which is a continuation of application No. 11/032,879, filed on Jan. 11, 2005, now Pat. No. 7,433,866, and a continuation of application No. 11/032,872, filed on Jan. 11, 2005, now Pat. No. 7,421,426.

(51) Int. Cl.
  *G06F 17/30* (2006.01)
(52) U.S. Cl.
  USPC ............................................. 707/706
(58) Field of Classification Search
  USPC ................................. 707/706–768
  See application file for complete search history.

(56) References Cited

U.S. PATENT DOCUMENTS

| | | | |
|---|---|---|---|
| 5,630,125 A | 5/1997 | Zellweger | |
| 5,819,451 A | 10/1998 | Khon | |
| 5,899,995 A | 5/1999 | Millier et al. | |
| 5,948,040 A * | 9/1999 | DeLorme et al. | 701/426 |
| 6,134,548 A * | 10/2000 | Gottsman et al. | 705/26.9 |
| 6,182,067 B1 | 1/2001 | Presnell et al. | |
| 6,353,824 B1 | 3/2002 | Boguraev et al. | |
| 6,370,551 B1 | 4/2002 | Golovchinsky et al. | |
| 6,377,983 B1 | 4/2002 | Cohen et al. | |
| 6,393,427 B1 | 5/2002 | Vu et al. | |
| 6,553,373 B2 | 4/2003 | Boguraev et al. | |
| 6,678,699 B2 | 1/2004 | Stephens et al. | |
| 6,732,090 B2 | 5/2004 | Shanahan et al. | |
| 6,778,979 B2 | 8/2004 | Grefenstette et al. | |
| 6,820,075 B2 | 11/2004 | Shanahan et al. | |
| 6,865,572 B2 | 3/2005 | Boguraev et al. | |
| 6,928,425 B2 | 8/2005 | Grefenstette et al. | |
| 6,948,163 B2 | 9/2005 | Melahn et al. | |

(Continued)

OTHER PUBLICATIONS

Hutchinson, I., "Graphics for Inclusion in Electronic Documents", Feb. 6, 2005, http://silas.psfc.mit.edu/elec_fig_figures, pp. 1-14.

(Continued)

*Primary Examiner* — Diane Mizrahi
(74) *Attorney, Agent, or Firm* — Fish & Richardson P.C.

(57) ABSTRACT

Systems and media for awarding credits based on provided usage information are disclosed. More particularly, hardware and/or software for collecting and disseminating usage information related to electronic documents and for awarding usage credits to users in exchange for providing usage information are disclosed. Embodiments include receiving an indication of the usage of an electronic document by a user and aggregating the received usage indication for the document with usage indications relating to other users. Embodiments may also include creating document utilization information for the electronic document based on the aggregated usage indications and awarding usage credit to the user based on the user's providing statistics on the usage of the electronic document. Further embodiments may include transmitting an indication of the awarded usage credit to the user and receiving a request to use the usage credits.

21 Claims, 6 Drawing Sheets

U.S. PATENT DOCUMENTS

| | | | |
|---|---|---|---|
| 6,959,319 B1 | 10/2005 | Huang et al. | |
| 7,069,271 B1 | 6/2006 | Fadel et al. | |
| 7,117,432 B1 | 10/2006 | Shanahan et al. | |
| 7,133,862 B2 | 11/2006 | Hubert et al. | |
| 7,181,438 B1 | 2/2007 | Szabo | |
| 7,249,314 B2 | 7/2007 | Walker et al. | |
| 7,284,191 B2 | 10/2007 | Grefenstette et al. | |
| 7,313,827 B2 | 12/2007 | Kelley et al. | |
| 7,367,048 B2 | 4/2008 | Kelley et al. | |
| 7,383,305 B2 | 6/2008 | Kelley et al. | |
| 7,386,569 B2 | 6/2008 | Berstis et al. | |
| 7,386,783 B2 | 6/2008 | Lection et al. | |
| 7,421,426 B2 * | 9/2008 | Berstis et al. | 1/1 |
| 7,433,866 B2 | 10/2008 | Berstis et al. | |
| 7,437,381 B2 | 10/2008 | Berstis et al. | |
| 7,469,331 B2 | 12/2008 | Hepkin et al. | |
| 7,475,021 B2 | 1/2009 | Wilbrink et al. | |
| 7,519,607 B2 | 4/2009 | Anderson | |
| 7,590,589 B2 | 9/2009 | Hoffberg | |
| 7,627,590 B2 | 12/2009 | Boguraev et al. | |
| 7,730,054 B1 | 6/2010 | Marmaros et al. | |
| 8,005,811 B2 | 8/2011 | Berstis et al. | |
| 8,073,852 B2 | 12/2011 | Berstis et al. | |
| 2001/0056463 A1 | 12/2001 | Grady et al. | |
| 2002/0035697 A1 | 3/2002 | McCurdy et al. | |
| 2002/0048369 A1 | 4/2002 | Ginter et al. | |
| 2002/0065848 A1 | 5/2002 | Walker et al. | |
| 2002/0078045 A1 | 6/2002 | Dutta | |
| 2002/0095443 A1 | 7/2002 | Kovack | |
| 2002/0184159 A1 | 12/2002 | Tadayon et al. | |
| 2003/0074369 A1 | 4/2003 | Schuetze et al. | |
| 2003/0126235 A1 | 7/2003 | Chandrasekar et al. | |
| 2003/0145306 A1 | 7/2003 | Melahn et al. | |
| 2004/0049571 A1 | 3/2004 | Johnson et al. | |
| 2004/0088415 A1 | 5/2004 | Chandrasekar et al. | |
| 2005/0210008 A1 * | 9/2005 | Tran et al. | 707/3 |
| 2006/0155782 A1 | 7/2006 | Berstis et al. | |
| 2006/0173818 A1 | 8/2006 | Berstis et al. | |
| 2006/0173837 A1 | 8/2006 | Berstis et al. | |
| 2007/0208719 A1 * | 9/2007 | Tran | 707/3 |
| 2008/0222000 A1 | 9/2008 | Berstis et al. | |
| 2008/0275871 A1 | 11/2008 | Berstis et al. | |
| 2009/0271389 A1 * | 10/2009 | Chickering et al. | 707/5 |

OTHER PUBLICATIONS

Non-final office action dated Apr. 19, 2007 for U.S. Appl. No. 11/032,872.
Notice of Allowance dated May 20, 2008 for U.S. Appl. No. 11/032,872.
Non-final office action dated Apr. 19, 2007 for U.S. Appl. No. 11/032,871 872.
Notice of Allowance dated Sep. 12, 2007 for U.S. Appl. No. 11/032,871.
Non-final office action dated Aug. 4, 2010 for U.S. Appl. No. 11/950,214.
Non-final office action dated Apr. 25, 2007 for U.S. Appl. No. 11/032,879.
Notice of Allowance dated Sep. 29, 2010 for U.S. Appl. No. 12/166,082.
Non-final office action dated Nov. 26, 2010 for U.S. Appl. No. 12/122,186.
Non-final office action dated May 14, 2007 for U.S. Appl. No. 11/039,534.
Final office action dated Oct. 26, 2007 for U.S. Appl. No. 11/039,534.
Examiner's Answer dated Jun. 20, 2008 for U.S. Appl. No. 11/039,534.
Board decision dated Sep. 27, 2010 for U.S. Appl. No. 11/039,534.
Notice of Allowance dated Dec. 23, 2010 for U.S. Appl. No. 12/166,082.
Notice of Allowance dated Jul. 28, 2008 for U.S. Appl. No. 11/032,879.
Final office action dated Apr. 1, 2011 for U.S. Appl. No. 12/122,186, 29 pages.
'Wikipedia' [online] "AllAdvantage" 2012 [retrieved on May 9, 2012]. Retrieved from the Internet: http://en.wikipedia.org/w/index.php?oldid=441937330 4 pages.
"Business Description (AllAdvantage IPO filing)". NASDAQ/Edgar Online. Retrieved on Oct. 8, 2006.

* cited by examiner

SYSTEMS AND MEDIA FOR AWARDING CREDITS BASED ON PROVIDED USAGE INFORMATION

CROSS-REFERENCE TO RELATED APPLICATION(S)

Pursuant to 35 USC §120, this continuation application claims priority to and the benefit of U.S. patent application Ser. No. 12/122,186, filed on May 16, 2008, and which claims priority to and the benefit of U.S. patent application Ser. No. 11/032,879, filed on Jan. 11, 2005 which is U.S. Pat. No. 7,433,866, issued on Oct. 7, 2008, the disclosure of which is incorporated herein in its entirety for all purposes. This application is also related to U.S. patent application Ser. No. 11/032,872, filed on Jan. 11, 2005 which is U.S. Pat. No. 7,421,426, issued on Sep. 2, 2008.

FIELD OF INVENTION

The present invention is in the field of data processing systems and, in particular, to systems and media for awarding usage credits to users, particularly for awarding usage credits based on providing usage information relating to electronic documents.

BACKGROUND

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk, storage drive (also known as a "hard drive"), a pointing device such as a mouse, and an optional network interface adapter. Examples of such personal computer systems are International Business Machine Corp.'s (IBM's) ThinkCentre™, ThinkPad™, Aptiva™, and IntelliStation™ series of personal computers. The use of mobile computing devices, such as notebook PCs, personal digital, assistants (PDAs), tablet PCs, sophisticated wireless phones, etc., has also become widespread. Mobile computing devices typically exchange some functionality or performance when compared to traditional PCs in exchange for smaller size, portable power, and mobility.

The widespread use of PCs and mobile computing devices in various segments of society has resulted in a reliance on computer systems both at work and at home, such as for telecommuting, news, stock market information and trading, banking, shopping, shipping, communication in the form of hypertext transfer protocol (http) and e-mail, as well as other services. Many of these functions take advantage of the communication abilities offered by the Internet. Such connectivity has facilitated unprecedented amounts of collaboration and sharing of information between individuals, both within organizations and outside organizational structures. This collaboration has resulted in individuals having access to and sharing vast amounts of information, often in the form of electronic documents. Electronic documents are digitized documents that contain text, graphics, photographs, etc., and can be read by various computer systems. Electronic documents may be in any file format, such as Portable Network Graphics (PNG), Joint Photographic Experts Group (JPEG), Graphics Interchange Format (GIF), Tag Image File Format (TIFF), Microsoft Word (DOC), Hypertext Markup Language (HTML), Adobe Systems Inc.'s Portable Document Format (PDF), etc. For many applications, electronic documents, particularly PDF documents, have supplanted printed material for the dissemination of information, as many journals, newsletters, books, articles, etc., are now distributed either exclusively or non-exclusively in electronic form.

While electronic documents possess improved qualities in many ways over hardcopies, such as cost, easy of distribution, and time to prepare, disadvantages of electronic documents when compared to paper documents do exist. One deficiency of electronic documents is that it is often difficult to find the most interesting or useful part of an electronic book or other document. With a paper book, individuals may observe which pages are the most worn or the pages to which the hook naturally opens due to frequent reading of those pages. One can easily discern which book in, say, a library is the most useful based on its wear, and one can also often find the most useful part of the book by noting the wear caused by frequent reading. Because of the fixed nature of an electronic document, electronic documents fail to provide such indications of frequently-read or particularly useful sections of the document.

The vast, amount of content, including electronic documents, available on public networks such as the Internet often makes it difficult for users to find useful and relevant information. Accordingly, many people utilize search engines to assist them in their search. Search engines are programs that search documents on a network for specified keywords and return to the requester a list, of documents where the keywords were found. Typically, a search engine works by sending out a "spider" to fetch as many documents as possible, after which an "indexer" reads the documents and creates an index for the words contained in each document. Each search engine then typically creates indices using a proprietary algorithm so that meaningful results are returned for each query. Example publicly-available search engines include those provided by Microsoft Corporation, Google Inc., Yahoo! Inc., etc.

While search engines are quite powerful, they suffer from some flaws. First, search engines do not always identify the most relevant links early in the search results, forcing the user to spend time reviewing multiple results to find the information they are seeking. Additionally, search engines do not always identify the portion of a document most likely to satisfy the customer or requester, as they only identify, at best, the portion of the document in which the search words were found. This problem is exacerbated for larger documents, as a user may not know where to look in a very long document for the most relevant information. Additionally, search engines are often misled by the frequent appearance of keywords, such as when document developers attempt to mislead a search engine into giving a higher priority for a particular site or document by incorporating large numbers of keywords in the document in a process known as "keyword spamming". Keyword spamming often results in erroneous or misleading query results, making the search engine less desirable for the user. Improving the performance of search engines will likely increase the usage of that search engine and thus the revenue generated from it.

There is, therefore, a need for an effective system to improve the functionality of search engines, particularly when search engines are used to find information contained in portions of electronic documents. In particular, there is a need to find information relevant to a user contained in portions of electronic documents.

SUMMARY OF THE INVENTION

The problems identified above are in large part addressed by systems, methods, and media for awarding credits based on provided usage information. Embodiments receive an indication of the usage of an electronic document by a user and aggregate the received usage indication received with usage indications relating to other users. Embodiments may then create document utilization information for the electronic document based on the aggregated usage indications and award usage credit to the user based on the user's usage of the electronic document. Further embodiments transmit an indication of the awarded usage credit to the user and receive a request from the user to use the usage credits.

Another embodiment provides a machine-accessible medium containing instructions effective, when executing in a data processing system, to cause the system to perform a series of operations for awarding credits based on provided usage information. Embodiments receive an indication of the usage of an electronic document by a user and aggregate the received usage indication with usage indications relating to other users. Embodiments may then create document utilization information for the electronic document based on the aggregated usage indications and award usage credit to the user based on the user's usage of the electronic document. Further embodiments transmit an indication of the awarded usage credit to the user and receive a request from the user to use the usage credits.

A further embodiment provides a data processing system that may include a document computer system and an aggregator server. The document computer system may include a usage tracking module for tracking a user's usage of an electronic document. The aggregator server may include an aggregator module and a usage credit module. The aggregator module creates document utilization information based on received usage information from one or more users and the usage credit module may award usage credit to users based on their usage of the electronic document. The data processing system may also include a search engine server for generating search results in response to a search request, where the search engine server may award statistics credits based on received document utilization information.

BRIEF DESCRIPTION OF THE DRAWINGS

Other objects and advantages of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Systems, methods and media for awarding credits based on provided usage information are disclosed. More particularly, hardware and/or software for collecting and disseminating usage information related to electronic documents and for awarding usage credits to users in exchange for providing usage information are disclosed. Embodiments include receiving an indication of the usage of an electronic document by a user and aggregating the received usage indication for the document with usage indications relating to other users. Embodiments may also include creating document utilization information for the electronic document based on the aggregated usage indications and awarding usage credit to the user based on the user's providing statistics on the usage of the electronic document. Further embodiments may include transmitting an indication of the awarded usage credit to the user and receiving a request to use the usage credits.

The disclosed embodiments encourage users to provide document usage information to document providers and encourage document providers to provide aggregated document utilization information to search engines by providing for credits in exchange for information. Incorporating document utilization information, in search results improves the quality of search results provided to users by providing more meaningful and accurate search results. Improved quality of search results may increase the usage and revenue of a search site, as well as increase access to electronic documents for which document utilization information is available. Encouraging users to provide document usage information via credits results in an incentive for more users to provide information, making the document utilization information more accurate and valuable.

While specific embodiments will be described below with reference to particular configurations of hardware and/or software, those of skill in the art will realize that embodiments of the present invention may advantageously be implemented with other substantially equivalent hardware and/or software systems.

Figure 1:
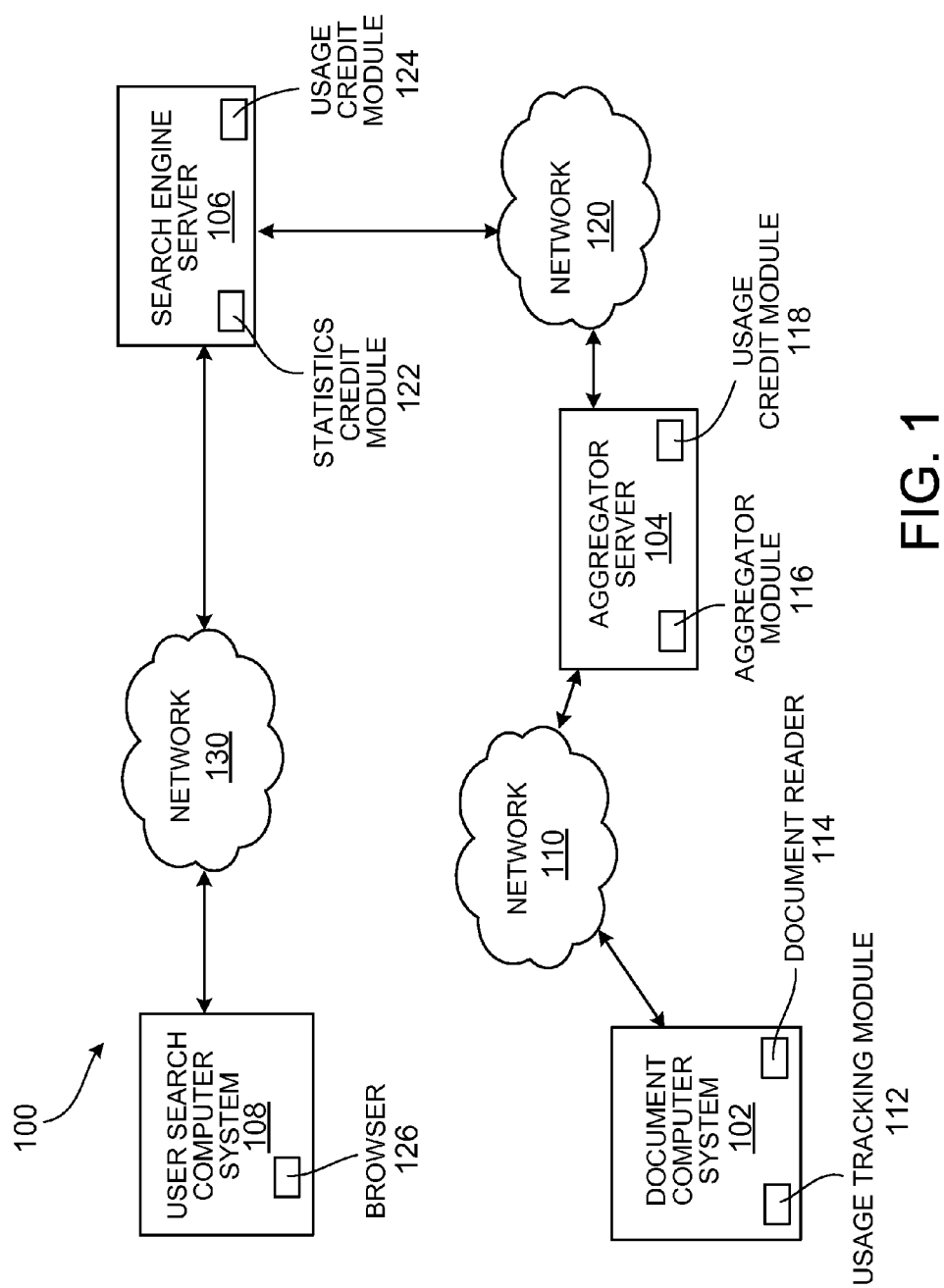
FIG. 1 depicts an environment for a system for collecting and disseminating electronic document usage information according to one embodiment.

Turning now to the drawings, FIG. 1 depicts an environment for a system for collecting and disseminating electronic document usage information according to one embodiment. In the depicted embodiment, the document usage system 100 includes one or more document computer systems 102 in communication with a network 110. Each document computer system 102 may contain a usage tracking module 112 and a document reader 114. A user may view electronic documents using the document reader 114 while the usage tracking module 112 tracks information relating to the user's access of particular electronic documents. In the depicted embodiments the document usage system 100 also includes one or more aggregator servers 104 in communication with the document computer systems 102 via network 110 for aggregating usage information gathered from users. Each aggregator server 104 may be in communication with one or more search engine servers 106 via network 120, while the one or more search engine servers 106 may be in communication with one or more user search computer systems 102 via network 130. A user on a user search computer system 108 may use a browser 126 or other program to request a search from a search engine server 106. A search engine server 106 may then provide search results to a user on a user search computer system 108 based at least partially on document utilization information received from an aggregator server 104.

Electronic documents may be digitized documents that contain text, graphics, photographs, etc. that may be read by various computer systems. Electronic documents may contain text or graphics and may use any type of file format, such as PNG, JPEG, GIF, TIFF, DOC, HTML, PDF, RTF, TXT, MCW, etc. Electronic documents may include any type of document, such as books, eBooks, articles, journals, World Wide Web (Web) pages, etc. Electronic documents may, in one embodiment, include multiple pages and/or other means of organizing the document, such as chapters, sections, volumes, etc.

Networks 110, 120, 130 may be any type of data communications channel, such as the Internet, an intranet, a LAN, a WAN, an Ethernet network, a wireless network, a proprietary network, a broadband cable network, etc. Networks 110, 120, and/or 130 may be the same or different networks. The Internet or other public network may be particularly useful as network 110, 120, and 130 when the search engine server 106 is hosting a publicly-accessible search site. Those skilled in the art will recognize, however, that the invention described herein may be implemented utilizing any type or any combination of data communications channels.

Document computer systems 102 may include personal computers, workstations, servers, mainframe computers, notebook or laptop computers, desktop computers, PDAs, tablet or palm PCs, set-top boxes, mobile phones, wireless devices, or the like. The usage tracking module 112 may track the user's usage of an electronic document being viewed. Usage of an electronic document may include opening or closing the electronic document, creating or deleting bookmarks in the electronic document, lime spent with the electronic document open, printing the electronic document, e-mailing or otherwise transmitting the electronic document, etc. In one embodiment, the usage of the electronic document is tracked based on the portion of the electronic document being used, such as a page, chapter, section, etc. of the document. As described in more detail in relation to the aggregator servers 104, users may earn usage credit from an aggregator server 104 based on their electronic document usage. The users may use their usage credit with either the aggregator server 104 or search engine server 106 to acquire improved services, discounted services, etc.

A user may utilize a document computer system 102 to view or read electronic documents using a document reader 114, such as a browser (e.g., Microsoft Corporation's Microsoft Explorer™, etc.), dedicated electronic document reader software (e.g., Adobe Systems Inc.'s Adobe Acrobat® or Reader), or other software. The document reader 114 may be any software module that is used to display an electronic document. Examples of current document readers 114 include Adobe Systems Inc.'s Adobe Acrobat® or Reader, Microsoft Corporation's Word™ or Reader™, Palm Corporation's Reader™, MobiPocket Reader, etc. A user may also use document computer system 102 (such as with document reader 114) to use usage credits they have earned (as described in more detail below), such as to order additional electronic documents, etc.

Figure 2:
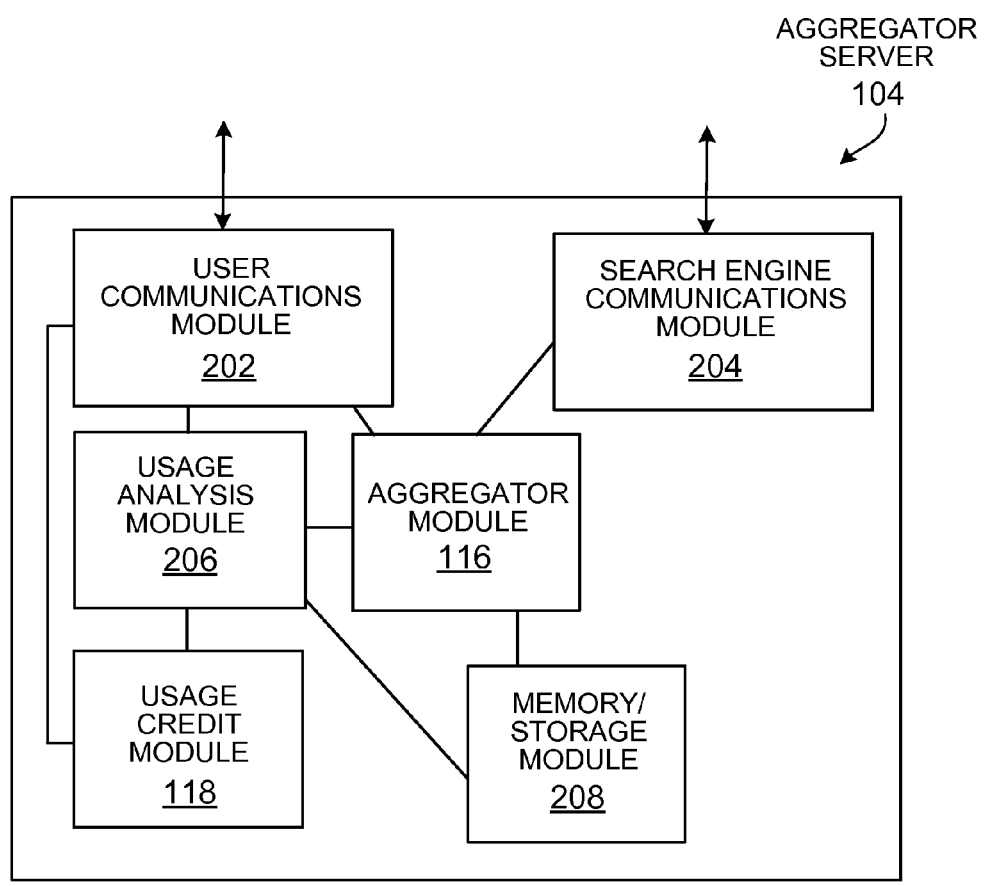
FIG. 2 depicts one embodiment of an aggregator server of the document usage system of FIG. 1.

Aggregator servers 104 may include one or more PCs, workstations, servers, mainframe computers, notebook or laptop computers, desktop computers, or the like, and are described in more detail in relation to FIG. 2. Each aggregator server 104 may include an aggregator module 116 for collecting and aggregating electronic document usage information received from users on a document computer system 102. For example, the aggregator module 116 may aggregate the amount of time that each user spent on a particular page of an electronic document for all users who viewed the document. In this embodiment, the aggregator module 116 determines the pages (or other sections or portions) of the electronic document on which users have spent the most time viewing. Time spent viewing a page or other portion of a document may be used as a proxy for the value, utility, or relevance of the information included on that page. The aggregator module 116 may analyze, collect, or aggregate electronic document usage information for electronic documents in any fashion.

Each aggregator server 104 may also include a usage credit module 118. The usage credit module 188 may award credits, called usage credits herein, to users who are using electronic documents and providing document usage information as a reward to those users. A user may exchange usage credits for any good or service, such as free usage of electronic documents, document utilization information for electronic documents, monetary rewards or other items, electronic coupons, or any other good or service. A user may also exchange usage credits to receive benefits from the search engine server 106, such as premium searches (e.g., more accurate, quicker, etc.), quicker searches, searches with less or no advertisements, etc. The usage credit module 118 may also manage awarded usage credits, facilitate users using their usage credits, etc. By providing usage credits to users who are using electronic documents and providing document usage information to an aggregator server 104, the document usage system 100 will encourage users to agree to provide document usage information. For many users, the incentive of getting usage credits will likely outweigh their reluctance to provide information about their particular usage.

One or more search engine servers 106 may be in communication with any aggregator modules 104 (via network 120) and with any user search computer systems 108. The one or more search engine servers 106 may include one or more PCs, workstations, servers, mainframe computers, notebook or laptop computers, desktop computers, or the like. A search engine server 106 may receive a search request from a user on a user search computer system 108, where the search request may include keywords or other parameters that define the scope of the user's desired search. After generating search results, search engine server 106 may transmit search results to a user on a user search computer system 108. A search engine server 106 may receive aggregated document utilization information from an aggregator server 104 to be used or supplement search results for the user.

The search engine server 106 may use received document utilization information gathered from a plurality of users to supplement search results provided to users. Document utilization information provides an indication of the valuable or relevant portions of a document based on the amount that a document (or portion of a document) has actually been used. For example, if a document matches the search request and thus appears in the search results, the document usage system 100 may point users to the most heavily used sections (i.e., the most relevant), potentially saving the user's time and improving the results. In another example, documents or sections of documents that have been heavily viewed by users may be moved up in the search result list, improving the quality of search results. Heavily viewed documents often provide more relevant and timely information to users, as users are unlikely to spend large amounts of time with documents that are not useful.

Each search engine sewer 106 may also include a usage credit module 124 and a statistics credit module 122. The usage credit module 124 of the search engine server 106 may be similar to the usage credit module 118 of the aggregator server 104, and either, or both, may grant and manage usage credits. Statistics credit module 122 may grant statistics credit to document providers in exchange for aggregated document utilization information. A document provider (e.g., aggregator server 104 owner, document author, document copyright owner, etc.) may exchange statistics credits for improved services from a search engine provider, such as higher visibility in search results, document utilization information related to other documents, free or discounted advertisements, cash or other items, etc. By providing statistics credits to document providers in exchange for document utilization information, search engine providers are able to encourage document, providers to supply document utilization information to improve the quality and content of their searches. Document providers, on the other hand, may receive significant benefits in exchange for information that they are already gathering.

User search computer systems 108 may include personal computers, workstations, servers, mainframe computers, notebook or laptop computers, desktop computers, PDAs, tablet or palm PCs, set-top boxes, mobile phones, wireless devices, or the like. A user search computer system 108 may include a browser 126 for creating and submitting search requests and for viewing search results. Browser 126 may be a graphical browser application that allows a user to view Internet or intranet content such as Microsoft Corporation's internet Explorer, Netscape Communication Corporation's Navigator, Mozilla, Apple Corporation's Safari, etc. Using a browser 126, a user may connect to a network site associated with a search engine server 106, create and submit a search, and view the search results when the search is completed. A single computer system may serve as both document computer system 102 and user search computer system 108. A user may also use user computer system 102 (such as with browser 126) to use usage credits, such as to request a premium search.

The document usage system 100 of the disclosed embodiments advantageously provides a methodology for encouraging users, document providers, and search engine providers to participate in the document usage system 100. Search engine providers are encouraged to participate as the disclosed embodiments advantageously provide improved results from search engines, increasing the value of search results to users and ultimately the number of users using a search engine and the potential revenue from the search engine. The improved results from search engines may result from either improved quality in the stems and ranking of items in the search result or improved, and more relevant, information regarding electronic documents included in the search results.

Document providers are encouraged to participate as they may earn statistics credit from search engine providers when they provide document utilization information to a search engine provider which the document providers may use to acquire improved services (e.g., higher visibility in search results) from the search engine provider. For example, a document provider may provide document utilization information for a particular document in exchange for the search engine provider providing additional weight to that document in creating search results. Document providers may also receive additional usage information for their documents and additional viewers of their documents.

Users are encouraged to use document usage system 100 by the ability to earn usage credits with which they may purchase improved or lower cost services if they provide document usage information pertaining to their usage of various electronic documents. For example, a user who allows document usage information to be gathered based on their usage and sent to an aggregator server 104, the document usage system 100 may allow that user to freely access aggregated document utilization information aggregated for electronic documents that they own or that are the result of one of their searches. In another example, the document usage system 100 may provide a discount on an electronic document (or provide it for tree) if the user is willing to allow a user tracking module 112 to gather document usage information.

Referring now to FIG. 2, depicts one embodiment of an aggregator server 104 of the document usage system 100 of FIG. 1. In the embodiment of FIG. 2, the aggregator server 104 includes an aggregator module 116, a usage credit module 118, a user communications module 202, a search engine communications module 204, a usage analysis module 206, and a memory module 208. The aggregator module 116 and usage credit module 118 are described in relation to FIG. 1. The user communications module 202 may receive information, such as document usage information, from the document computer systems 102 via the network 110. The user communications module 202 may also transmit information, such as aggregated document utilization information, to the document user computer systems 102. The search engine communications module 204 may transmit aggregated document usage information or other information to a search engine server 106 via network 120. The search engine communications module 204 may also receive search result statistics or other information from the search engine server 106.

The usage analysis module 206 may provide more sophisticated analysis of the document usage information collected and aggregated by the aggregator module 116. For example, the usage analysis module 206 may sort and/or analyze the usage information by type of user, class of user, type of usage (e.g., printing, viewing, etc.), different timeframes (e.g., giving more weight to more recent usage), etc. In one embodiment, an administrator or other user may customize the type of analysis that is performed by the usage analysis module 206. Memory module 208 may store any type of information, such as user preferences, electronic documents, document usage information, document utilization information, etc. Any type of memory may be used, including fixed or removable media, permanent or temporary storage, volatile or non-volatile memory, hard drives, CD-ROMs, etc. In one embodiment, memory module 208 may store document identification information, such as document name or identifier, creation or modification date, edition, publisher, document type (e.g., DOC, PDF, etc.), etc. Memory module 208 may maintain document usage information in, for example, a table in the memory module 208 organized by document identification. In one embodiment, when no user has provided data for a particular electronic document, memory module 208 may store an indication that no data exists.

Figure 3:
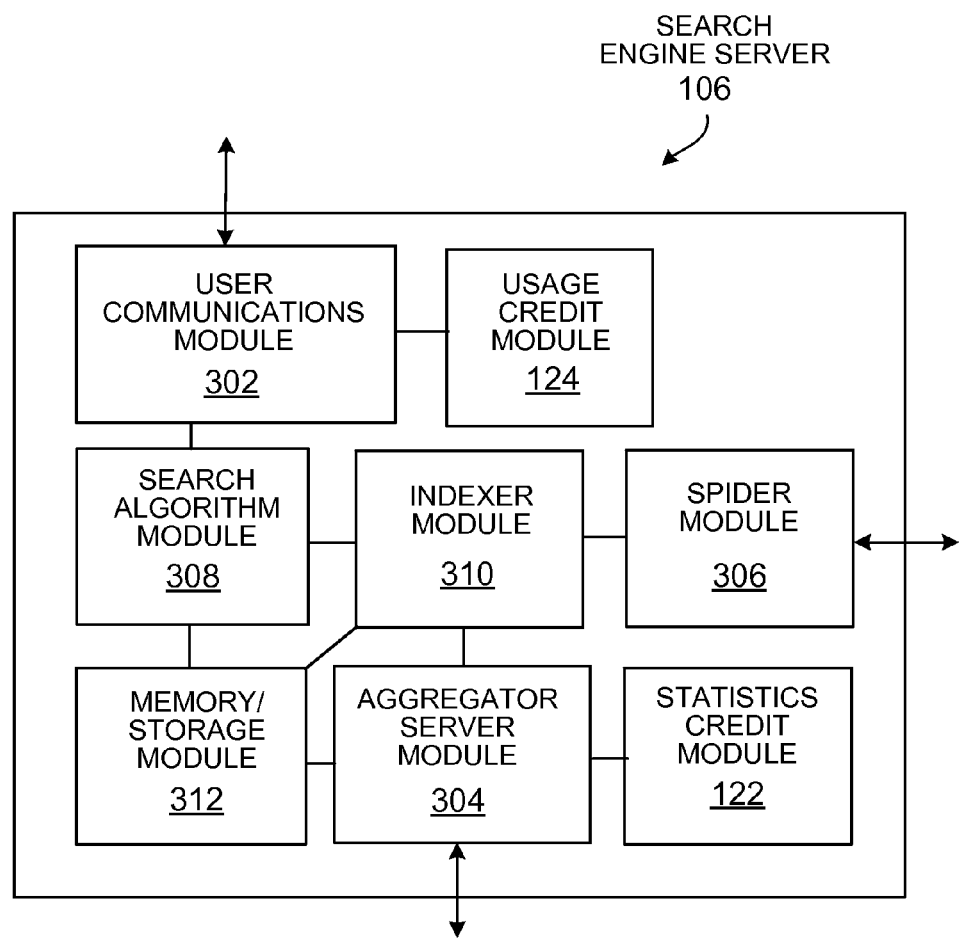
FIG. 3 depicts one embodiment of a search engine server of the document usage system of FIG. 1.

Referring now to FIG. 3, there is shown a search engine server 106 of the document usage system 100 of FIG. 1 according to one embodiment. The functions of the various modules of FIGS. 2 and 3 may be combined or distributed in any fashion between the aggregator server 104 and search engine server 106. In the embodiment of FIG. 3, the search engine server 106 includes a usage credit module 124, a statistics credit module 122, a user communications module 302, an aggregator server module 304, a spider module 306, a search algorithm module 308, an indexer module 310, and a memory module 312. The usage credit module 124 and the statistics credit module 122 are described in relation to FIG. 1. The user communications module 302 may receive an indication of a search request or other information from a user search computer system 108 via the network 130. The user communications module 302 may also transmit an indication of search results or other information to a user search computer system 108. The aggregator server module 304 may receive aggregated document utilization information from the aggregator server 104 and may also transmit search result statistics to the aggregator server 104. Either the user communication module 302 or the aggregator server module 304 may also receive document usage information relating to a particular user.

The spider module 306 may search the content of sites and/or documents on a network (e.g., the Internet), after which the indexer module 310 may analyze the content of the sites and/or documents to create an index for the words contained in each. The index may be stored in the memory module 312. Memory module 312 may store any type of information, such as generated indexes, document usage information, search results, etc., and memory module 312 may utilize any type of memory. In response to receiving a search request from a user, the search algorithm module 308 may search the index created by the indexer module 310 to determine the items (and the ranking of items) in the search result. The search result may include a list of documents (and associated network addresses) where the keywords in the search request were found. The search result may include a ranking of 'hits', or sites and documents satisfying the search, based on their likely interest to the requesting user. The search results may also include a selection of the content in the document containing the keywords.

In one embodiment, the search algorithm module 308 may utilize document utilization information received by the aggregator server module 304 in addition to the index of keywords. For example, if the number of users or the time spent by users for a plurality of electronic documents is known, the search algorithm module 308 may rank those electronic documents in any search requests for which they satisfy the keyword search in descending order of usage. An electronic document that has been read more often, in other words, might be ranked higher than an electronic document that has been read less frequently. In another example, the search result may reference the portion of an electronic document that is most utilized (as identified by the aggregator module 104), either by link or the content itself, in the search results generated by the search algorithm module 308. This allows a user viewing the search results to see the content most likely to meet their needs.

In an alternative embodiment, the search algorithm module 308 may improve the search results based on the particular usage patterns of the requesting user. For example, if the requesting user has provided document usage information previously their document usage information may be used to further improve the search results. The search algorithm module 308 in this embodiment may tune the search algorithm based on previous searches performed by a user, what type of documents the user has found most interesting previously, etc. As an example, if users spend a very high percentage of their time reviewing documents related to photography, the search results could be optimized based on the assumption that their present search likely relates to that same subject.

Figure 4:
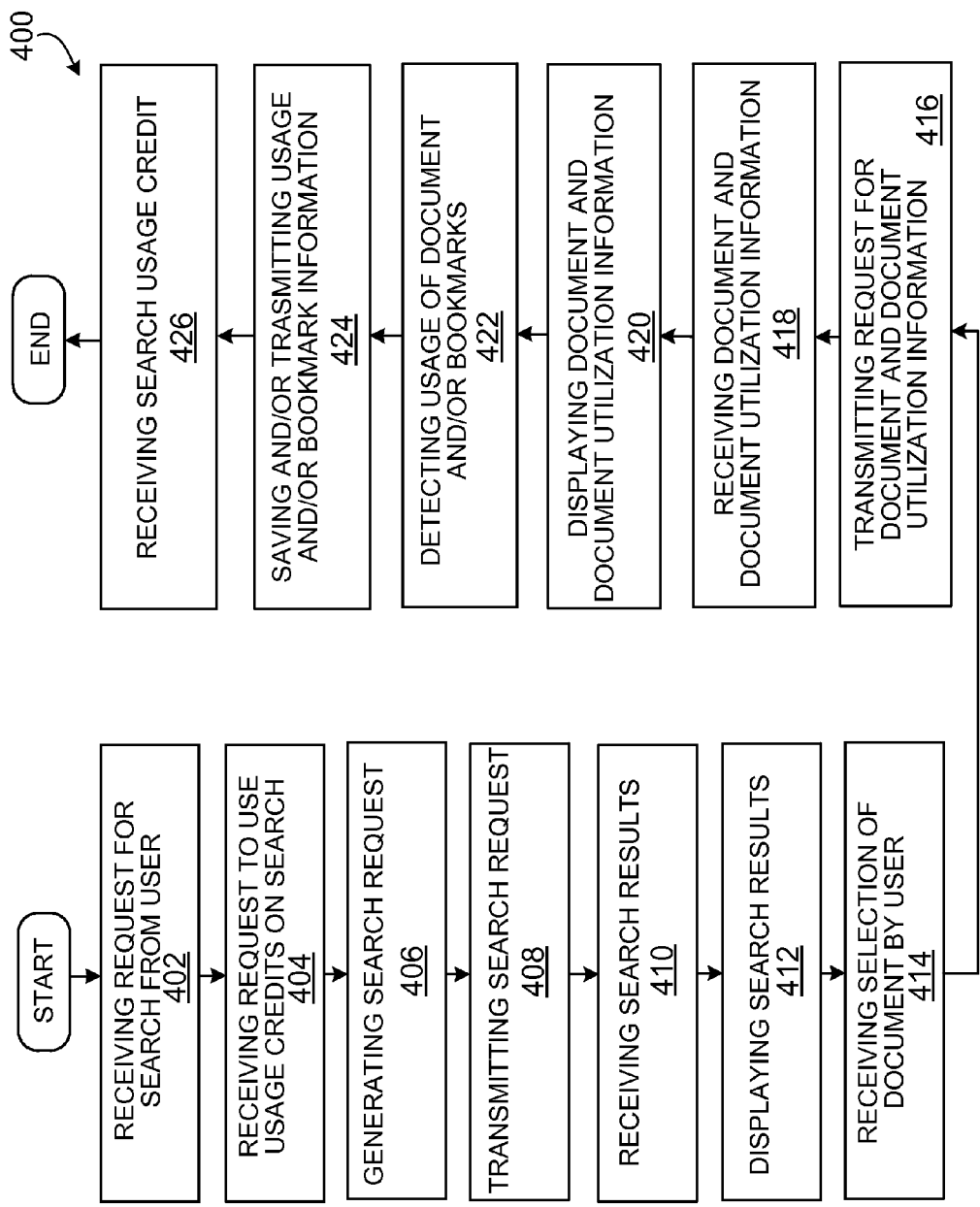
FIG. 4 depicts an example of a flow chart for determining electronic document usage and requesting a search according to one embodiment.

FIG. 4 depicts an example of a flow chart 400 for determining electronic document usage and requesting a search according to one embodiment. The method of flow chart 400 may be performed, in one embodiment, by a usage tracking module 112 of a document computer system 102 and a browser 126 of a user search computer system 108. In one embodiment, a single computer system (having both a browser 126 and usage tracking module 112) may serve as both the document computer system 102 and the user search computer system 108. In another embodiment, a user search computer system 108 may perform elements 402 through 412 while a document computer system 102 performs elements 414 through 424.

Flow chart 400 begins with element 402, receiving a request for a search from a user. In one embodiment, the request for a search from a user may include one or more keywords. A user may generate a request for a search by inputting keywords (such as on a network site associated with the search engine) using a browser 126 on a user search computer system 108. The method of flow chart 400 may also receive a request from a user to use accrued usage credits on their search in element 404. A user may choose to use accumulated usage credits to pay for an improved or premium search, such as a quicker search, more accurate search, advertisement-free search, etc. A search engine server 106 or aggregator server 104 may grant usage credits to users in exchange for provided document usage information. The method of flow chart 400 generates a search request in element 406 based on the user's request for a search and request to use usage credits, if any, and transmits the generated search request to a search request server 106 in element 408. In method of flow chart 400 continues to element 410, where it receives search results from the search engine server 106. The search results may then be displayed to the user, such as via browser 126, in element 412.

After a user views the search results, the user may choose to view some of the documents appearing in the search results. In element 414, the method of flow chart 400 receives selection of a document by a user. The user may select a document, in one example, by clicking on a link associated with the document on their browser 126. The method of flow chart 400 then may then transmit a request for the document and associated document utilization information, if available, to a document provider, an aggregator server 104, etc. in element 416. In another embodiment, a copy of the electronic document may be located at the search engine server 106, eliminating the need to transmit a request. In yet another embodiment, the document may be located at one location (e.g., with the document provider) while the document utilization information at another (e.g., the aggregator server 104). The method of flow chart 400 then receives the document (and any document utilization information) in element 418 and displays the document (with any document utilization information) to the user in element 420.

If a user has agreed to allow document usage information to be collected while they view a particular electronic document, the method of flow chart 400 continues to element 422, detecting usage of an electronic document and/or bookmarks by the user. Element 422 may be performed by a usage tracking module 112 of a document computer system 102. In one embodiment, an indication of the usage of the electronic document is the time a user spends viewing a particular page or other section of the document. For example, the usage of an electronic document may be the time a user spends viewing pages or other sections within a PDF document in a document reader 114. If a user spends a relatively long period of time viewing a particular page, for example, it is evidence that the user finds value in the information on that page. Similarly, if the user quickly moves past a page, it may reflect less value to that page. Quickly skipping over a page may reflect a lower value than never seeing a page at all, as an unseen page may have more potential to have value than one that is quickly reviewed and moved past. In another example, the usage of an electronic document includes printing of a page of a document, another indication that the user finds that page valuable. Element 422 may include detection of any type of usage, including both active and passive uses. In an alternative embodiment, the method of flow chart 400 determines if the user is actively viewing the document before counting time spent with the document open as viewing to improve the accuracy of the determination. In addition to detecting usage, the method of flow chart 400 also optionally detects bookmarks created in the electronic document in element 422. The creation or deletion of bookmarks in an electronic document is a type of usage of an electronic document that may provide an even more direct relation to the value a user places on the information on that page. A user typically creates a bookmark on a page of an electronic document when they desire to be able to quickly get back to that page or do not want to forget the location of the information on that page, making bookmarks good evidence that the user finds the information on the page valuable. Similarly, if a user deletes a bookmark, it is good evidence that the user no longer finds the information of value on that page.

After detecting document usage information and/or bookmarks, the method of flow chart 400 continues to element 424. In this element, flow chart 400 saves any document usage information, including bookmark information, to any type of storage and transmits any document usage and/or bookmark information to an aggregator server 104 via network 110. The method of flow chart 400 may receive usage credit in element 426, after which flow chart 400 terminates. The method of flow chart 400 may receive an indication of the usage credit from an aggregator server 104, search engine server 106, etc.

Figure 5:
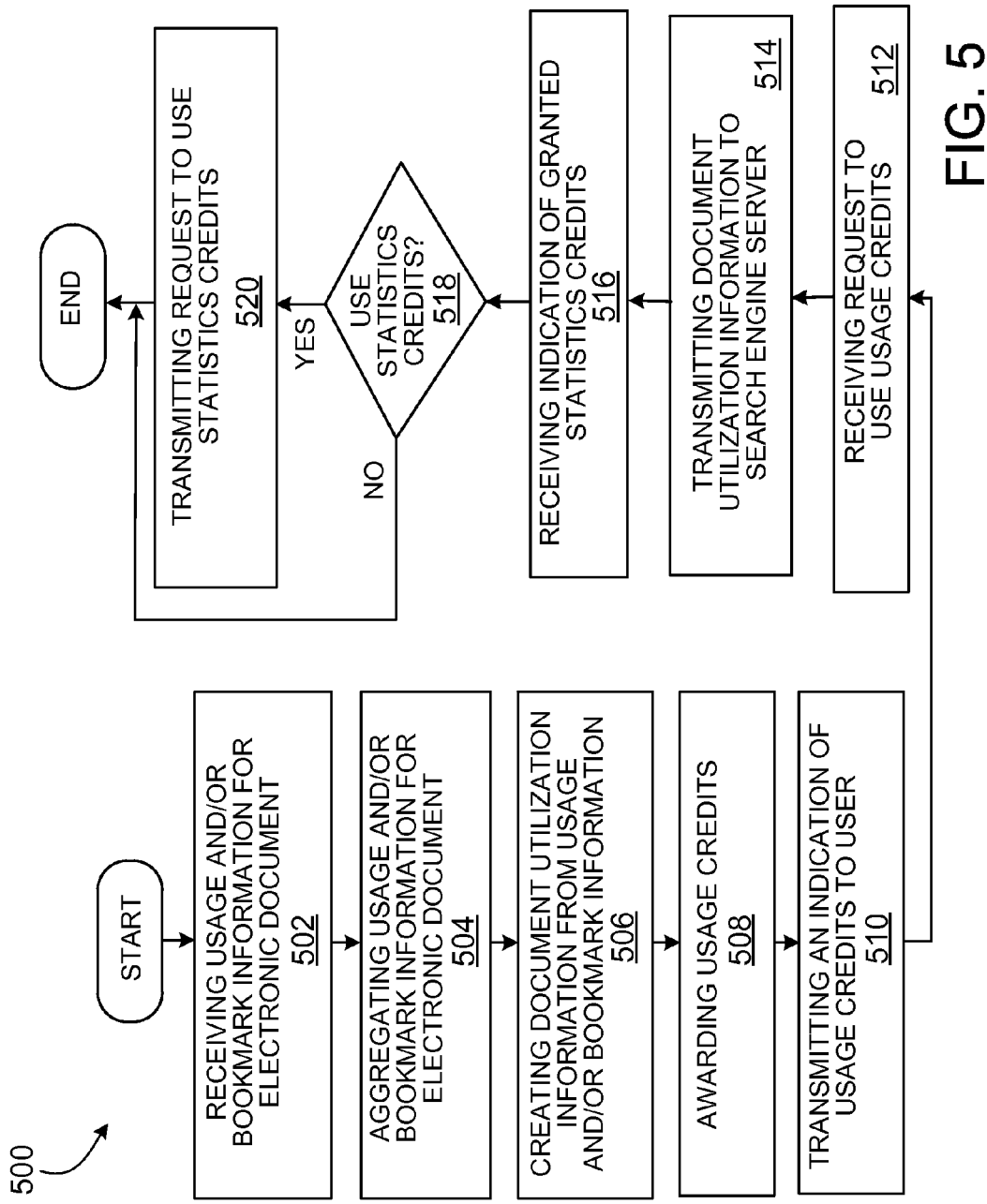
FIG. 5 depicts an example of a flow chart for aggregating electronic document usage information according to one embodiment.

FIG. 5 depicts an example of a flow chart 500 for aggregating electronic document usage information according to one embodiment. The method of flow chart 500 may be performed, in one embodiment, by an aggregator server 104. The method of flow chart 500 begins with element 502, receiving document usage and/or bookmark information, such as from a plurality of users on document computer systems 102. The method of flow chart 500 may also receive information about the user and/or computer system that transmitted the information along with the document usage information. After receiving document usage and/or bookmark information, the method of flow chart 500 then continues to element 504, aggregating document usage and/or bookmark information from multiple users and/or document computer systems 102 for a particular electronic document. Aggregation may occur at the page level (collecting usage of that pages among multiple users), or it may occur at different levels of fidelity, such as higher levels (e.g., chapters, sections, articles, etc.) or lower levels (e.g., paragraphs, sentences, etc.). In one embodiment, the method of flow chart 500 determines the amount of time users cumulatively spent on each page of a particular electronic document. In another embodiment, the method of flow chart 500 determines the percentage of users who bookmarked each page of an electronic document.

After usage and/or bookmark information has been collected, the method of flow chart 500 continues to element 506, creating document utilization information from the aggregated usage and/or bookmark information for a particular document. In one example, document utilization information for a particular electronic document includes the relative amounts of time spent on each page of an electronic document by aggregated users. For example, the document utilization information could indicate that users spent an average of 30 seconds on page 1, two minutes on page 2, and 13 seconds on page three, and so on. A bar chart or histogram-like display could be created illustrating the time spent on each page. Using this visual representation, a user could see that page 2, in this example, is probably the most valuable of the electronic document pages. Any methodology is possible for aggregating the usage and/or bookmark information, and particular types of processing might be requested by users or administrators, set up as defaults, may be used in response to particular types of data, etc.

After creating document utilization information, the method of flow chart 500 may award usage credits to a user in element 508. Usage credits may include any type of credit, reward, or benefit that may be given to a user in exchange for providing document usage information. In one embodiment, usage credits may be exchanged for discounted or free services relating to electronic documents. For example, a user may receive usage credits that may be exchanged for additional electronic documents. In another example, a user may exchange usage credits for premium versions of electronic documents, such as electronic documents that include document utilization information or full versions of articles, chapters, etc. The method of flow chart 500 may award users with usage credits for any type of document usage, such as time spent viewing documents, the number of documents viewed, the number of bookmarks created, etc. The method of flow chart 500 may also award users with usage credits based on any number of factors, including the quality of a user's usage (e.g., how well it corresponds to other users). groups for which the user qualifies (e.g., Ph.D.'s, ages 18-49, income above $100,000, etc.), etc. After awarding usage credits, the method of flow chart 500 continues to element 510, where an indication of the awarded usage credits is transmitted to the user. At optional element 512, the method of flow chart 500 may receive a request from a user to use some or all of their usage credits in exchange for search-related benefits, such as a premium search.

An aggregator server 104 performing the method of flow chart 500 may receive and use statistics credits granted by a search engine server 106 in exchange for services provided to the search engine server 106. After creating document utilization information, an aggregator server 104 may transmit the aggregated document utilization information to a search engine server 106 via network 120 at element 514 for use in responding to user search requests. As described below in relation to FIG. 6, document utilization information may increase the value and relevancy of search results and is thus of value to search engine providers. In element 516, the method of flow chart 500 may receive an indication of statistics credits granted by a search engine server 106 or search engine provider. If the method of flow chart 500 has any available statistics credits (either from previous transactions or received in element 516), it may use those credits in decision block 518. If statistics credits are not used, the method terminates. If statistics credits are used, the method of flow chart 500 continues to element 520, where a request to use statistics credits is transmitted to the search engine server 106, after which the method terminates. Statistics credits may be exchanged for premium services, such as improved visibility in search results, free searching services, free advertisements to users, etc. In one example, a document provider may transmit document utilization information for its documents to a search engine provider in exchange for improved visibility in the search engine provider's search results. This allows for a document provider to receive more hits from users for its documents as more users will see (and thus choose) the link to their documents. This also allows for a search provider to acquire document utilization information which it may use to improve the quality and relevancy of its searches to users, thus potentially increasing users and revenue.

Figure 6:
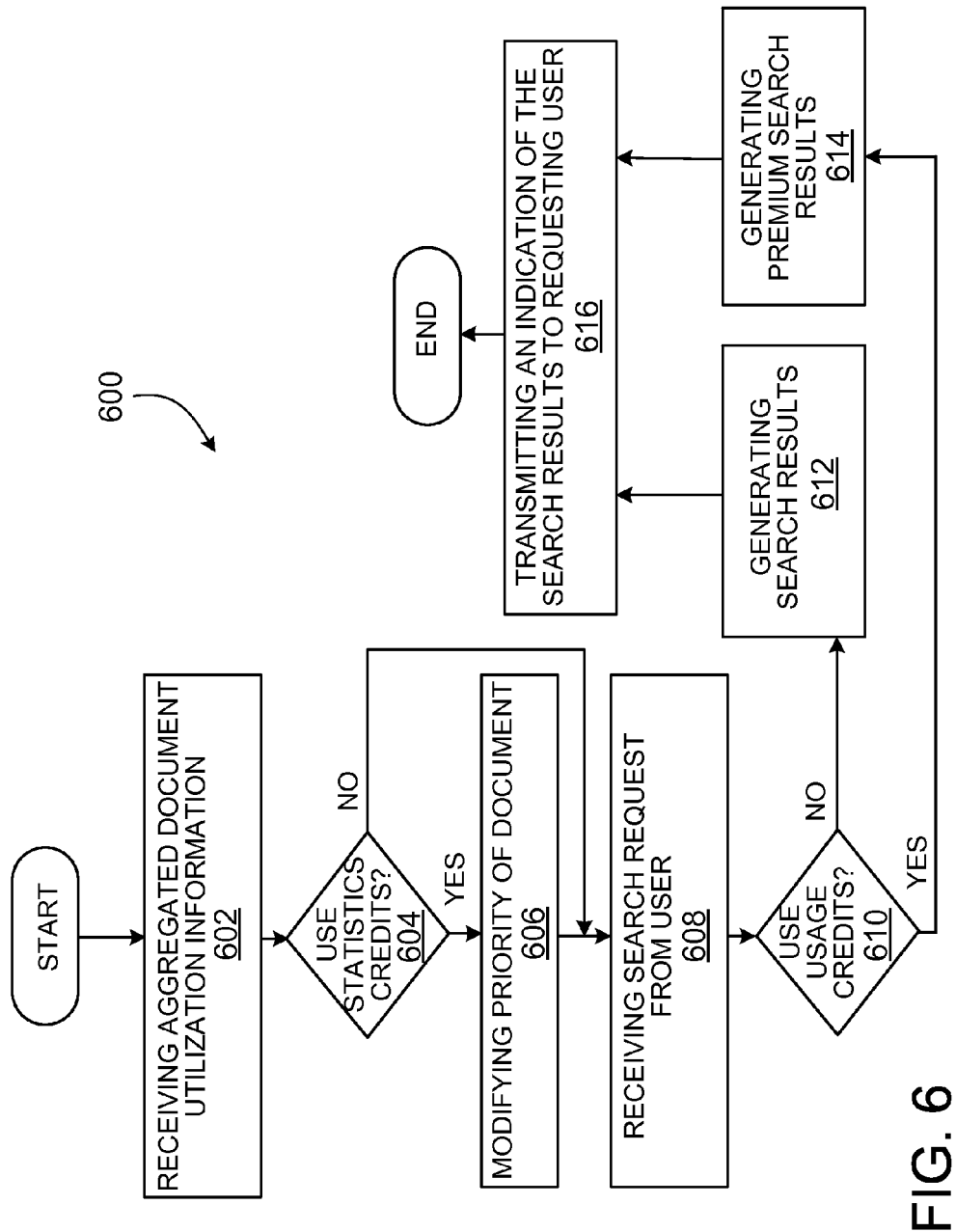
FIG. 6 depicts an example of a flow chart for receiving electronic document usage information and generating search results according to one embodiment.

FIG. 6 depicts an example of a flow chart 600 for receiving electronic document usage information and generating search results according to one embodiment. The method of flow chart 600 may be performed, in one embodiment, by a search engine server 106. In element 602, the method of flow chart 600 may receive aggregated document utilization information relating to one or more documents from an aggregator server 104. The method of flow chart 600 may also receive an indication of a request to use statistics credits from the aggregator server 104 or document provider in decision block 604. In one embodiment, the credits may be used to enhance the priority of a search. If there is no request to use statistics credits, flow chart 600 continues to element 608. If there is a request to use statistics credits, flow chart 600 continues to element 606, in another embodiment modifying the priority of a document in search results for a document provider when statistics credits are cashed in. Increasing the priority of a document makes the document more likely to be selected by a user from their search results, as many users start from the beginning of the search results to find the content for which they are looking This provides an incentive for document providers (e.g., owners of aggregators servers 104) to provide document utilization information to a search engine. A search engine server 106 may provide other benefits or take other actions in response to a document provider or aggregator server 104 using statistics credits instead of an improved priority for documents, such as providing payment, free advertising, premium searches, etc.

After handling any statistics credits, the method of flow chart 600 may continue to element 608, receiving a search request from a user. The received search request may be generated by a user inputting keywords (such as on a network site associated with the search engine) using a browser 126 on a user search computer system 108 and then transmitting the request to the search engine server 106. The method of flow chart 600 may also receive an indication of a request to use usage credits from the user in decision block 610. If there is no request to use usage credits, element 612 is invoked and search results are generated in response to a user's search request. If there is a request to use usage credits, flow chart 600 continues to element 614, generating premium search results in response to a user's search request.

For both elements 612 and 614, search results may be generated based on the user's search request, the keyword index, document utilization information, etc. A search engine may use document utilization information in any fashion, such as by giving the information a particular weight versus the search index, using the document utilization information to identify a particular relevant portion of a document, using the document utilization information as factors in determining the search results, etc. By using document utilization information provided by the aggregator server 104, the quality and usefulness of the search results may be improved. Knowledge of which portions of a document are more used than others allows a search engine algorithm to consider the value of a portion of a document when generating search results. The search of element 614 differs from that of element 612 in that it is a premium search (for which the user 'bought' by trading in usage credits). A premium search may use a more sophisticated algorithm (e.g., including document utilization information), may be faster, may be cheaper, may include fewer or no advertisements, may be delivered in a different fashion, etc. After generating search results in either element 612 or 614, the method of flow chart 600 continues to element 616, transmitting an indication of the search results to the requesting user on a user search computer system 108, after which the method terminates.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and, hence, executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates methods, systems, and media for awarding credits based on provided electronic document usage information. It is understood that the form of the invention shown and described in the detailed description and the drawings are to be taken merely as examples. It is intended that the following claims be interpreted broadly to embrace ail the variations of the example embodiments disclosed.

The invention claimed is:

1. A computer-implemented method comprising:
obtaining aggregate document usage information provided by a plurality of users for a first document wherein the document usage information represents interactions of the plurality of users with a same specific position within the first document wherein the document usage information includes an amount of time that the plurality of users spent accessing the position in the document;
receiving a query submitted by a user of a computer system;
obtaining search results responsive to the query wherein each search result identifies a respective document and wherein at least one of the search results identifies the first document;
ordering the search results based on, at least, the document usage information; and
after the ordering, providing the search results to the computer system.

2. The method of claim 1 wherein an interaction is creation or deletion of a bookmark for the location in the first document by a user of the plurality of users.

3. The method of claim 2 wherein the document usage information includes data indicating a portion of the plurality of users that created a bookmark for the location in the first document.

4. The method of claim 1 wherein the at least one search result that identifies the first document identifies the location in the first document.

5. The method of claim 1 wherein the amount of time is aggregated by page, chapter, section or article.

6. The method of claim 1 wherein a rank of the first document in the order is based on, a least, the amount of time.

7. The method of claim 1, further comprising providing credit to one or more of the plurality of users wherein the credit can be exchanged by the one or more users for goods, services, coupons, monetary rewards, or access to documents.

8. A computer readable medium having instruction stored thereon that, when executed by one or more computers, causes the one or more computers to perform operations comprising:
 obtaining aggregate document usage information provided by a plurality of users for a first document wherein the document usage information represents interactions of the plurality of users with a same specific position within the first document wherein the document usage information includes an amount of time that the plurality of users spent accessing the position in the document;
 receiving a query submitted by a user of a computer system;
 obtaining search results responsive to the query wherein each search result identifies a respective document and wherein at least one of the search results identifies the first document;
 ordering the search results based on, at least, the document usage information; and
 after the ordering, providing the search results to the computer system.

9. The computer readable medium of claim 8 wherein an interaction is creation or deletion of a bookmark for the location in the first document by a user of the plurality of users.

10. The computer readable medium of claim 9 wherein the document usage information includes data indicating a portion of the plurality of users that created a bookmark for the location in the first document.

11. The computer readable medium of claim 8 wherein the at least one search result that identifies the first document identifies the location in the first document.

12. The computer readable medium of claim 8 wherein the amount of time is aggregated by page, chapter, section or article.

13. The computer readable medium of claim 8 wherein a rank of the first document in the order is based on, a least, the amount of time.

14. The computer readable medium of claim 8, wherein the operations further comprise providing credit to one or more of the plurality of users wherein the credit can be exchanged by the one or more users for goods, services, coupons, monetary rewards, or access to documents.

15. A system comprising:
 a computer readable medium having instruction stored thereon; and
 one or more computers programmed to execute the instructions to perform operations comprising:
  obtaining aggregate document usage information provided by a plurality of users for a first document wherein the document usage information represents interactions of the plurality of users with a same specific position within the first document wherein the document usage information includes an amount of time that the plurality of users spent accessing the position in the document;
  receiving a query submitted by a user of a computer system;
  obtaining search results responsive to the query wherein each search result identifies a respective document and wherein at least one of the search results identifies the first document;
  ordering the search results based on, at least, the document usage information; and
  after the ordering, providing the search results to the computer system.

16. The system of claim 15 wherein an interaction is creation or deletion of a bookmark for the location in the first document by a user of the plurality of users.

17. The system of claim 16 wherein the document usage information includes data indicating a portion of the plurality of users that created a bookmark for the location in the first document.

18. The system of claim 15 wherein the at least one search result that identifies the first document identifies the location in the first document.

19. The system of claim 15 wherein the amount of time is aggregated by page, chapter, section or article.

20. The system of claim 15 wherein a rank of the first document in the order is based on, a least, the amount of time.

21. The system of claim 15, wherein the operations further comprise providing credit to one or more of the plurality of users wherein the credit can be exchanged by the one or more users for goods, services, coupons, monetary rewards, or access to documents.

* * * * *